(12) United States Patent
Senum

(10) Patent No.: US 7,353,260 B1
(45) Date of Patent: Apr. 1, 2008

(54) SYSTEM AND METHOD FOR ACCESS CONTROL ON A STORAGE ROUTER

(75) Inventor: Steven John Senum, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 902 days.

(21) Appl. No.: 10/461,306

(22) Filed: Jun. 13, 2003

(51) Int. Cl.
*G06F 15/16* (2006.01)
*G06F 15/173* (2006.01)

(52) U.S. Cl. ............... 709/217; 709/223; 709/229

(58) Field of Classification Search ......... 709/217, 709/223, 229
See application file for complete search history.

(56) References Cited

U.S. PATENT DOCUMENTS

| | | | |
|---|---|---|---|
| 6,470,453 B1 * | 10/2002 | Vilhuber | 726/4 |
| 6,895,461 B1 * | 5/2005 | Thompson | 710/305 |
| 7,082,535 B1 * | 7/2006 | Norman et al. | 713/163 |
| 7,188,194 B1 * | 3/2007 | Kuik et al. | 709/249 |
| 2001/0044893 A1 * | 11/2001 | Skemer | 713/153 |
| 2003/0056096 A1 * | 3/2003 | Albert et al. | 713/168 |

* cited by examiner

*Primary Examiner*—William Vaughn
*Assistant Examiner*—Kristie D. Shingles
(74) *Attorney, Agent, or Firm*—Schwegman, Lundberg & Woessner P.A.

(57) ABSTRACT

Systems and methods control access to an iSCSI target on a storage area network. The systems and methods include an access control list having a set of one or more entries. Each entry may have an access control type and an access control value. Requests may be received from an initiator on a host connected to the system through a network interface. The request may include a set of one or more initiator authentication values, each of the initiator authentication values having an initiator authentication type. The access control list may be searched for an entry matching the authentication type and value. If such an entry is not found, access to the target may be denied.

34 Claims, 5 Drawing Sheets

SYSTEM AND METHOD FOR ACCESS CONTROL ON A STORAGE ROUTER

RELATED FILES

This invention is related to application Ser. No. 10/128,656, filed Apr. 22, 2002, now U.S. Pat. No. 7,165,258, issued on Jan. 16, 2007, entitled "SCSI-BASED STORAGE AREA NETWORK", application Ser. No. 10/131,793, filed Apr. 22, 2002, entitled "VIRTUAL SCSI BUS FOR SCSI-BASED STORAGE AREA NETWORK", provisional application Ser. No. 60/374,921, filed Apr. 22, 2002, entitled "INTERNET PROTOCOL CONNECTED STORAGE AREA NETWORK", and application Ser. No. 10/356,073, filed Jan. 31, 2003, entitled "STORAGE ROUTER WITH INTEGRATED SCSI SWITCH", all of the above of which are hereby incorporated by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2003, Cisco Systems, Inc., All Rights Reserved.

FIELD

This invention relates generally to software access control, and more particularly to providing access control on a storage router.

BACKGROUND

The use of Storage Area Networks (SANs) continues to grow. Generally described, a SAN is a specialized network of storage devices that are connected to each other and to a server or cluster of servers that act as an access point to the SAN. SAN's typically use special switches as a mechanism to connect the storage devices. Typically the switches are Fibre Channel based switches.

A SAN provides many advantages to users requiring large amounts of storage. First, a SAN helps to isolate storage activity from a general purpose network. For example, a SAN can be providing data to users on the general purpose network at the same time it is being backed up for archival purposes. The data traffic associated with the backup does not compete for bandwidth on the general purpose network, it typically stays on the specialized network.

An additional advantage is that a SAN can be reconfigured, i.e. storage can be added or removed, without disturbing hosts on the general purpose network.

Recently the iSCSI protocol has provided a means for computers on a TCP/IP based network to take advantage of SAN technology without the need for purchasing and installing expensive Fibre Channel interfaces and software for each host desiring access to the SAN. The iSCSI protocol has provided increased flexibility in the location of SANs with respect to the hosts that accesses the SAN, because the SAN and the host need only have a TCP/IP based network in order to communicate.

Security issues related to SANs have not generally been considered as a problem with past systems. In these systems, the SAN was typically connected to a host via a fibre channel network. In these environments the host may provide for security and access control to the SAN network. However, in the case of iSCSI, any host on a TCP/IP network that can reach the SAN may attempt to access the SAN. In such an environment, users may be able to access data on the SAN that they were not meant to see, and a malicious user may damage or delete data on the SAN. As a result, there is a need in the art for the present invention.

SUMMARY

The above-mentioned shortcomings, disadvantages and problems are addressed by the present invention, which will be understood by reading and studying the following specification.

Systems and methods control access to an iSCSI target on a storage area network. The systems and methods include an access control list having a set of one or more entries. Each entry may have an access control type and an access control value. Requests may be received from an initiator on a host connected to the system through a network interface. The request may include a set of one or more initiator authentication values, each of the initiator authentication values having an initiator authentication type. The access control list may be searched for an entry matching the authentication type and value. If such an entry is not found, access to the target may be denied.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1A:
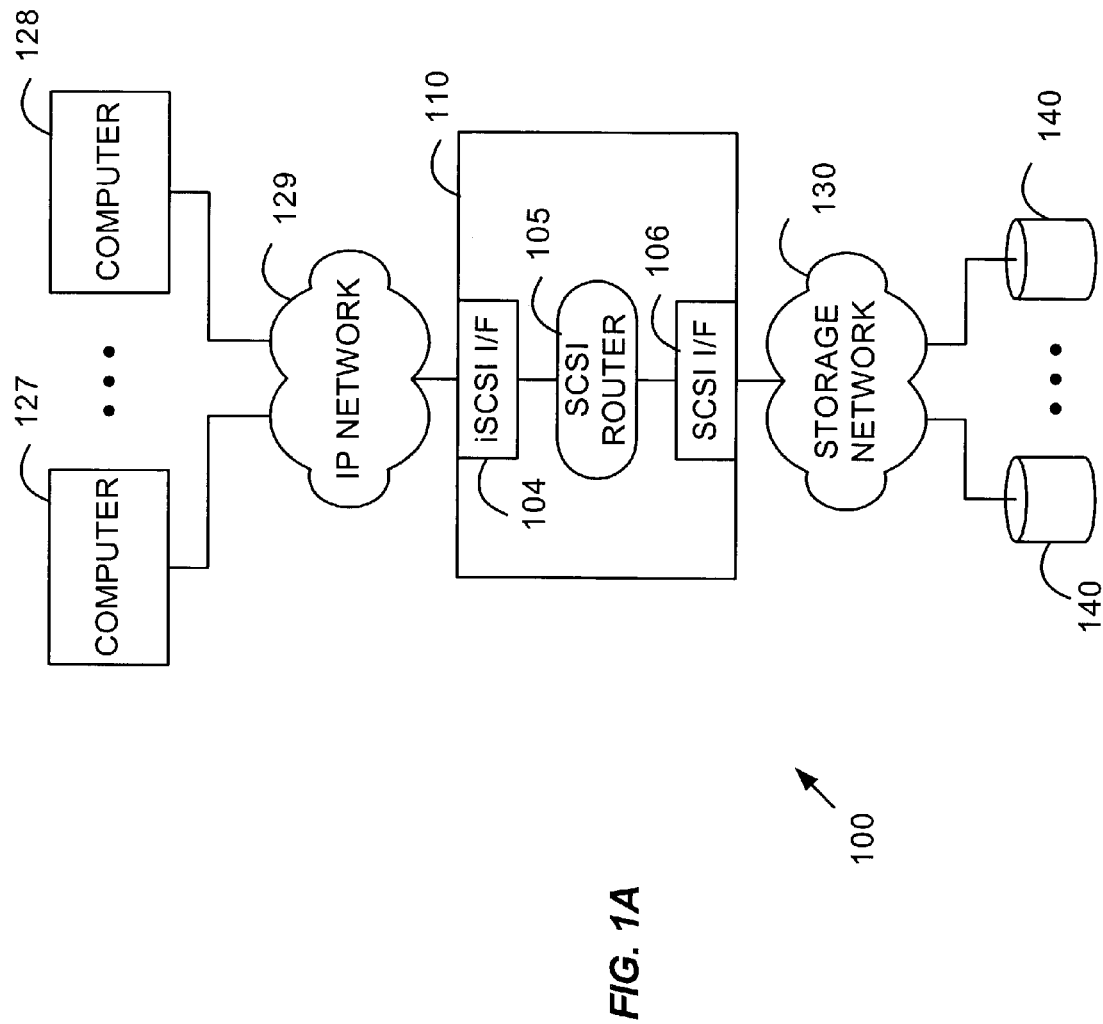
FIG. 1A is a block diagram of a storage router hardware and operating environment in which different embodiments of the invention can be practiced.

Some embodiments of the invention operate in an environment of systems and methods that provide a means for Fibre Channel based Storage Area Networks (SANs) to be accessed from TCP/IP network hosts. FIG. 1A is a block diagram describing the major components of such a system. Storage router system 100 includes computers (127, 128) connected through an IP network 129 to storage router 110. Storage router 110 is connected in turn through storage network 130 to one or more SCSI devices 140. In the embodiment shown in FIG. 1A, storage router 110 includes an iSCSI interface 104, a SCSI router 105 and a SCSI interface 106. iSCSI interface 104 receives encapsulated SCSI packets from LP network 129, extracts the SCSI packet and send the SCSI packet to SCSI router 105. SCSI interface 106 modifies the SCSI packet to conform to its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. Mappings between an iSCSI target to multiple physical devices can be established using configuration programs on storage router 110. An iSCSI target always contains at least one Logical Unit Number (LUN). Each LUN on an iSCSI target is mapped to a single LUN on a physical storage target.

Figure 1B:
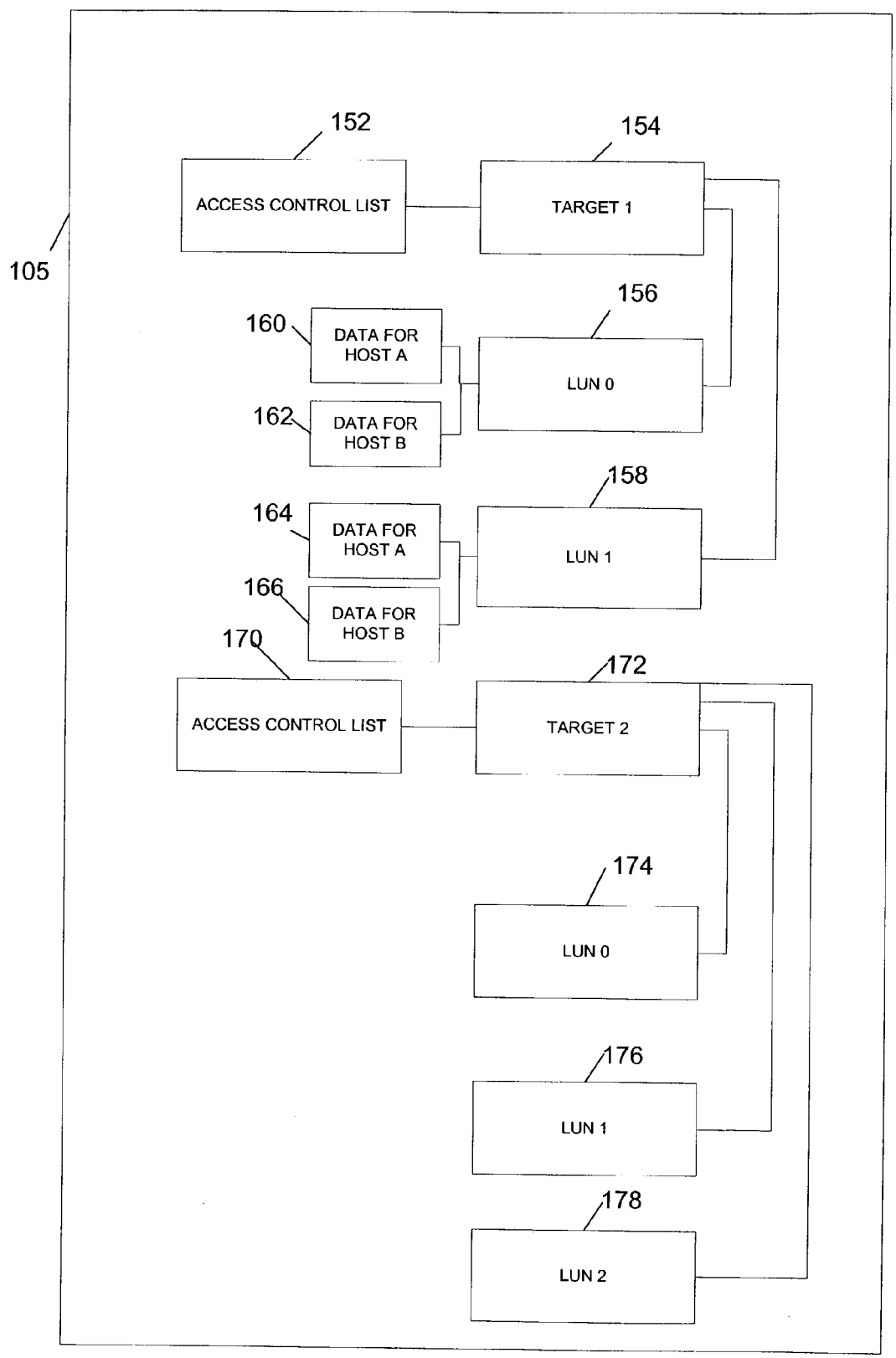
FIG. 1B is a block diagram of data structures used within the operating environment of FIG. 1A according to an embodiment of the invention.

FIG. 1B depicts a block diagram of example data structures, which may maintained by SCSI router 105 that may be used to implement an embodiment of the invention. Illustrated are targets 154 and 172, which may be data structures that represent devices attached to the storage network 130, such as the device 140. Associated with the target 154 are LUNs (logical unit numbers) 156 and 158, which are data structures that represent separately addressable logical units within the device associated with the target 154. Associated with the target 172 are LUNs 174, 176, and 178, which are data structures that represent separately addressable logical units within the device associated with the target 172. Although two targets 154 and 172 are shown, any number may be present. Although two LUNs 156 and 158 are shown associated with the target 154 and three LUNs 174, 176, and 178 are shown associated with the target 172, any number may be present.

Associated with the LUN 156 are data for host A 160 and data for host B 162. Associated with the LUN 158 are data for host A 164 and data for host B 166. Thus, each host that is accessing a particular LUN may have its own associated data for that LUN. Although two hosts are shown accessing LUN 156 and the same two host are shown accessing the LUN 158, in another embodiment any number of the same or different hosts may be accessing the LUNs.

The data for host A 160 may contain an indication of which command table is to be used when commands from host A directed to LUN 156 are processed. The data for host B 162 may contain an indication of which command table is to be used when commands from host B directed to LUN 156 are processed. The data for host A 164 may contain an indication of which command table is to be used when commands from host A directed to LUN 158 are processed. The data for host B 166 may contain an indication of which command table is to be used when commands from host B directed to LUN 158 are processed. In some embodiments, command tables are used to specify a routines to be executed when a particular command is received.

An access control list 152 is associated with the target 154, and an access control list 170 is associated with the target 172. Access control lists may include data regarding hosts that are allowed to access resources controlled by storage router 110. These resource may include targets, memory resources, command tables, and read/write permissions with respect to targets.

Figure 1C:
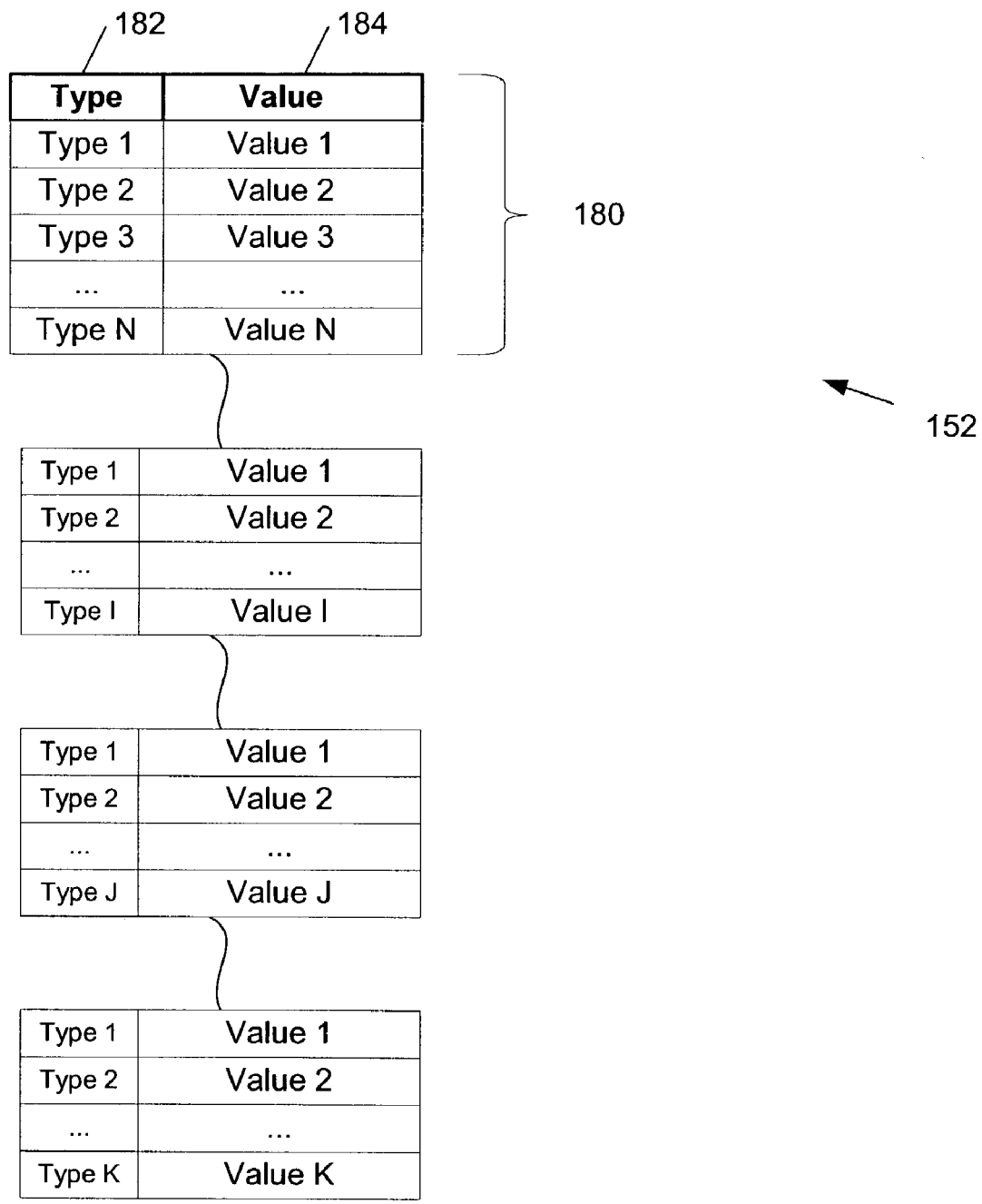
FIG. 1C is a block diagram of an access control list used in some embodiments of the invention.

FIG. 1C is an illustration of an exemplary access control list 152 according to various embodiments of the invention. In some embodiments, access control list 152 is implemented as a linked list of tables 180. Those of skill in the art will appreciate that other data structures besides a linked list may be used. For example, a single table could be used and is within the scope of the invention. In some embodiments, each table 180 comprises a set of access control entries that include an access control type field 182 and an access control value field 184. The type field 182 and value field 184 define an individual access control parameter.

In some embodiments, the type field 182 may include values indicating an IP address, an iSCSI name, or a CHAP (Challenge Handshake Authentication Protocol) name. The value in the value field 184 is interpreted according to the value in the type field 182. For example, if the type field 182 indicates an IP address, then value field 184 is interpreted as an IP address/mask pair defining a range of IP addresses for hosts allowed to access a target. If type field 182 indicates an iSCSI name, then value field 184 contains a text string defining an iSCSI name for an initiator on a host. If type field 182 indicates a CHAP name, then value field 184 contains a text string defining a CHAP name. In some embodiments, the CHAP name is the system name of the initiator.

The system may be expanded to include additional types to those mentioned above. Values may include a single value to match, a pattern to match against, a range of values, or a generalized string matching syntax such as a regular expression.

Figure 2:
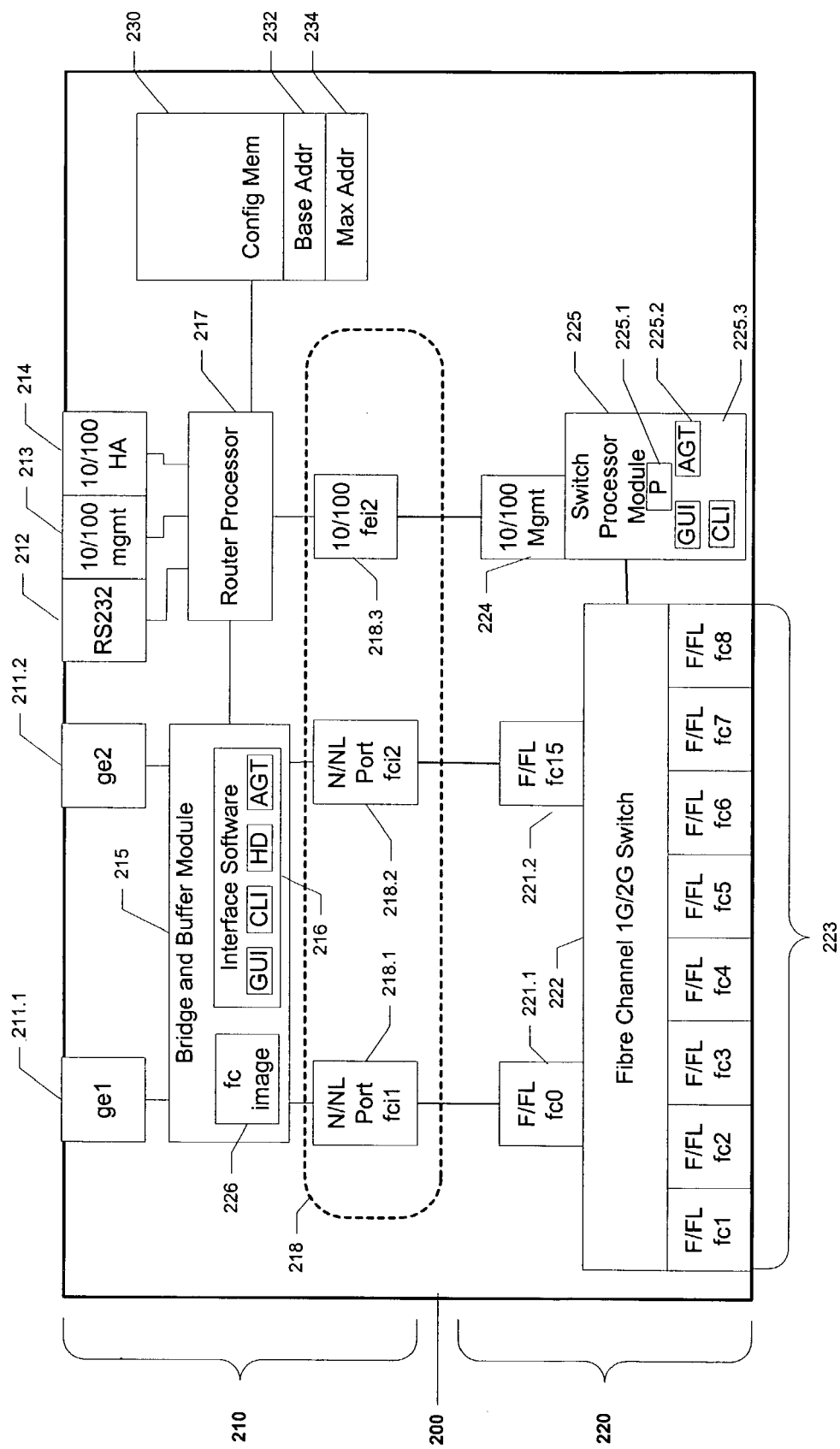
FIG. 2 is a block diagram of the major hardware components of a storage router according to an embodiment of the invention.

FIG. 2 is a block diagram providing further details of the major hardware components comprising storage router 110 and ISI router 111. In some embodiments, a storage router 110 or ISI router 111 includes a router portion 210 and a switch portion 220 on a common motherboard 200. The motherboard is powered by a power supply (not shown) and cooled by common cooling system, such as a fan (also not shown).

Router portion 210, which in the exemplary embodiment complies with draft 08 and later versions of the iSCSI protocol and incorporates commercially available router technology, such as the 5420 and 5428 Storage Routers from Cisco Systems, Inc. of San Jose, Calif., includes Gigabit Ethernet (GE) ports 211.1 and 211.2, console port 212, management port 213, high-availability (HA) port 214, bridge-and-buffer module 215, interface software 216, router processor 217, and router-to-switch interface 218.

GE ports 211.1 and 211.2 couple the storage router to an IP network for access by one or more servers or other computers, such as servers or iSCSI hosts (in FIG. 1). In some embodiments, GE ports 211.1 and 211.2 have respective MAC addresses, which are determined according to a base MAC address for the storage router plus 31 minus the respective port number. Two or more Gigabit Ethernet interfaces may be available. In some embodiments, one or more of the Gigabit Ethernet interfaces may provide internal support for maintaining Virtual Local Area Networks (VLANs). Each SCSI router typically supports a single IP address. The SCSI router IP address may be tied to any network (or VLAN) on either GE interface. Generally at least one SCSI router instance is created for each GE interface.

Console port 212 couples to a local control console (not shown). In the exemplary embodiment, this port takes the form of an RS-232 interface.

Management port 213 provides a connection for managing and/or configuring storage router 110. In the exemplary embodiment, this port takes the form of a 10/100 Ethernet port and may be assigned the base MAC address for the router-switch.

HA port 214 provides a physical connection for high-availability communication with another router-switch, such as storage router 110 in FIG. 1. In the exemplary embodiment, this port takes the form of a 10/100 Ethernet port, and is assigned the base MAC address plus 1.

Bridge-and-buffer module 215, which is coupled to GE ports 211.1 and 211.2, provides router services that are compliant with draft 08 and later versions of the iSCSI protocol. In the exemplary embodiment, module 215 incorporates a Peripheral Component Interface (PCI) bridge, such as the GT64260 from Marvell Technology Group, LTD. of Sunnyvale, Calif. Also module 215 includes a 64-megabyte flash file system, a 1-megabyte boot flash, and a 256-megabyte non-volatile FLASH memory (not shown separately.) Configuration memory 230 may be part of the flash file system, the boot flash or the non-volatile flash memory, or it may be a separate non-volatile flash memory. In addition, in alternative embodiments, configuration memory 230 may be part of a hard disk, CD-ROM, DVD-ROM or other persistent memory (not shown). The invention is not limited to any particular type of memory for configuration memory 230.

In addition to data and other software used for conventional router operations, module 215 includes router-switch interface software 216. Router-switch software 216 performs iSCSI routing between servers and the storage devices. The software includes an integrated router-switch command line interface module CLI and a web-based graphical-user-interface module (GUI) for operation, configuration and administration, maintenance, and support of the router-switch 110. Both the command-line interface and the graphical user interface are accessible from a terminal via one or both of the ports 213 and 214. Additionally, to facilitate management activities, interface software 216 includes an SNMP router-management agent AGT and an MIB router handler HD. (SNMP denotes the Simple Network Management Protocol, and MIB denotes Management Information Base (MIB)). The agent and handler cooperate with counterparts in switch portion 220 (as detailed below) to provide integrated management and control of router and switching functions in router-switch 200.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas(such as areas where log and configuration files are written).

Coupled to router processor 217 as well as to bridge-and-buffer module 215 is router-to-switch (RTS) interface 218. RTS interface 218 includes N/NL switch-interface ports 218.1 and 218.2 and management-interface port 218.3, where the port type of N or NL is determined by negotiation. N type ports may act as a Fibre Channel point to point port, NL type ports may negotiate as a loop.

Switch-interface ports 218.1 and 218.2 are internal Fibre Channel (FC) interfaces through which the router portion conducts I/O operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, switch-interface ports 218.1 and 218.2 are hidden from the user. One exception is the WWPN of each internal port. The internal WWPNs are called "initiator" WWPNs. Users who set up access control by WWPN on their FC devices set up the device to allow access to both initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a Switch Management Language (SML) Application Program Interface (API) that is part of interface software 216. One example of a suitable API is available from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223.1-223.8, a management interface port 224, and a switch processor module 225.

FC interface ports 221.1 221.2 are coupled respectively to ports of 218.1 and 218.2 of the router-to-switch interface via internal optical fiber links, thereby forming internal FC links. In the exemplary embodiment, each FC interface supports auto-negotiation as either an F or FL port.

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information.

FC ports 223.1-223.8, which adhere to one or more FC standards or other desirable communications protocols, can be connected as point-to-point links, in a loop or to a switch. For flow control, the exemplary embodiment implements a Fibre Channel standard that uses a look-ahead, sliding-window scheme, which provides a guaranteed delivery capability. In this scheme, the ports output data in frames that are limited to 2148 bytes in length, with each frame having a header and a checksum. A set of related frames for one operation is called a sequence.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory that includes a switch management agent 225.2, and a switch MIB handler 225.3. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Further details on the operation of the above describe system, including high availability embodiments can be found in application Ser. No. 10/128,656, entitled "SCSI-BASED STORAGE AREA NETWORK", application Ser. No. 10/131,793, entitled "VIRTUAL SCSI BUS FOR SCSI-BASED STORAGE AREA NETWORK", and provisional application Ser. No. 60/374,921, entitled "INTERNET PROTOCOL CONNECTED STORAGE AREA NETWORK", all of which have been previously incorporated by reference.

Figure 3:
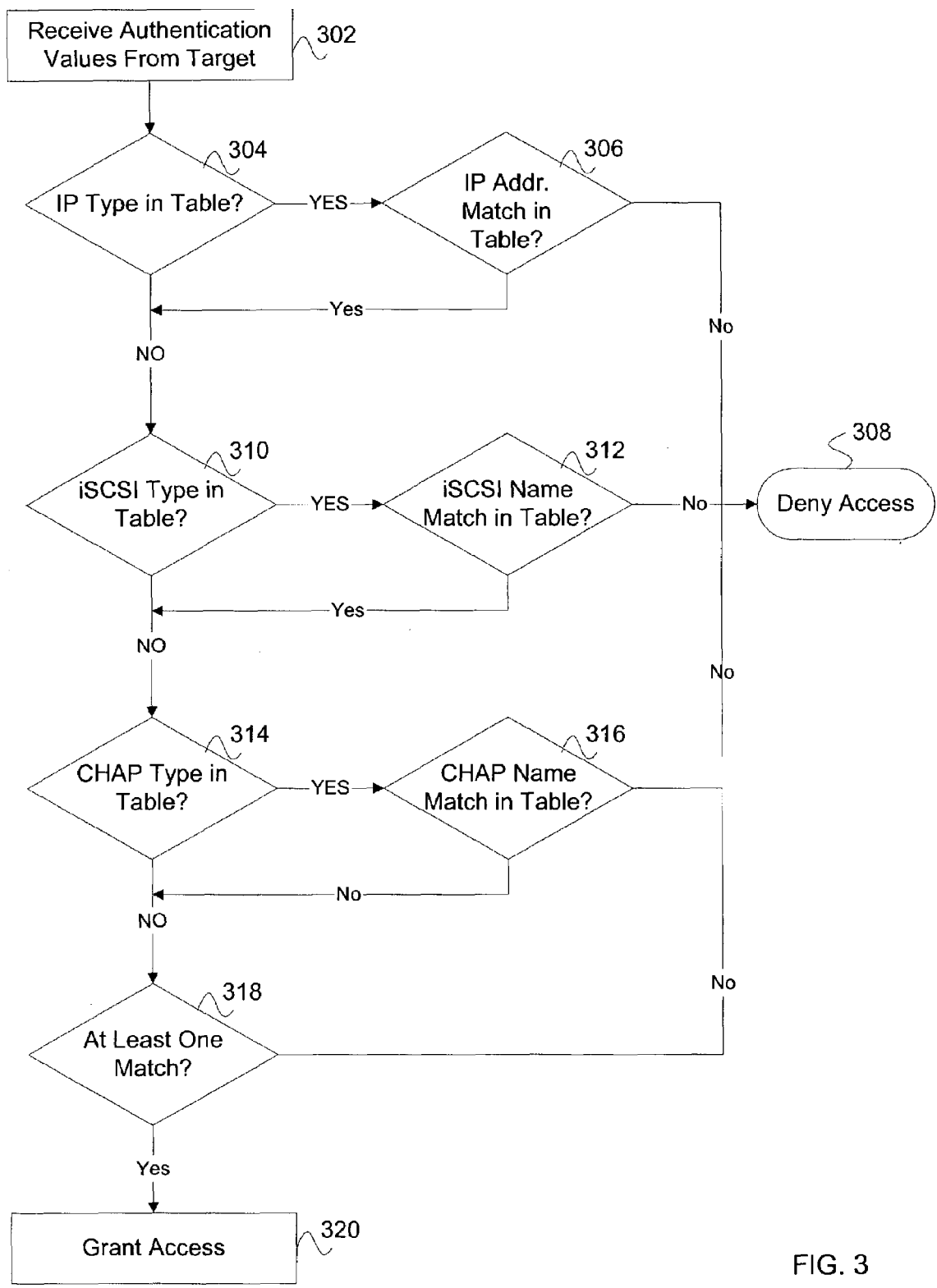
FIG. 3 is a flowchart illustrating a method of controlling access to an iSCSI target according to an embodiment of the invention.

FIG. 3 is a flowchart illustrating a method according to embodiments of the invention for controlling access to resources associated with a storage router. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media such as ROM, RAM, CD-ROM, hard disks, signals on network interfaces, etc.). The method illustrated in FIG. 3 is inclusive of acts that may be taken by an operating environment executing an exemplary embodiment of the invention.

The method begins when a system executing the method receives authentication values from an initiator desiring to access a target (block 302). In some embodiments, the authentication values may include a combination of one or more of an IP address for the initiator, an iSCSI name of the initiator, and/or a CHAP name for the initiator.

The system then checks to see if any IP ranges have been defined in an access control list for the desired target (block 304). If any IP ranges exist, they are checked for matches to the IP address authentication value (block 306). In some embodiments, the IP range is specified as a bitmask, where a one indicates a significant bit and a zero indicates an ignored bit. If a match cannot be found, access to the target is denied (block 308).

If an IP match is found, or if no IP ranges were defined in the access control list, the system checks to see if there any iSCSI name type exists in the access control list (block 310). If an iSCSI name type exists and if iSCSI name authentication value was supplied, the system then checks to see if there is a match between the iSCSI name authentication value and an iSCSI name in the access control list (block 312). If a match cannot be found, access to the target is denied (block 308).

Otherwise, if an iSCSI name match was found, or if no iSCSI name type is in the access control list, the system checks to see if any CHAP names exist in the access control list (block 314). If a CHAP name type exists and if a CHAP name authentication value was supplied, the system then checks to see if there is a match between the CHAP name authentication value and a CHAP name in the access control list (block 316). If a match cannot be found, access to the target is denied (block 308).

If there is at least one match on an authentication value (block 318), then access to the target is granted (block 320). Alternatively, if no matches are found, then in some embodiments access to the target is denied (block 308). In alternative embodiments, the condition of no matches may result in access being granted (block 320). For example, if the type of the authentication value does not match any types are in the access control list, then the default action may be to grant access rather than deny access.

CONCLUSION

Systems and methods controlling access to devices in a storage area network are disclosed. The embodiments of the invention provide advantages over previous systems. This application is intended to cover any adaptations or variations of the present invention. The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for controlling access to a target on a storage area network, the method comprising:
   providing an access control list to an iSCSI router of a storage router, the access control list having a set of one or more entries, each entry having an access control type and an access control value;
   receiving a request to access the target from an initiator;
   receiving a set of one or more initiator authentication values, each of said initiator authentication values having an initiator authentication type;
   for each of the initiator authentication types, searching the access control list for a matching authentication control type; and
   if a matching control type exists in the access control list for an authentication type, then if the authentication value does not match the access control value for the access control denying access to the target.

2. The method of claim 1, wherein the access control list type comprises an Internet Protocol type and the access control value defines one or more Internet Protocol addresses.

3. The method of claim 2, wherein the one or more Internet Protocol addresses are expressed as a bitmask defining a range of Internet Protocol addresses.

4. The method of claim 1, wherein the access control type comprises an iSCSI type and the access control value comprises an iSCSI name.

5. The method of claim 1, wherein the access control type comprises a CHAP type and the access control value comprises a CHAP name.

6. The method of claim 1, wherein the access control value comprises a pattern, and wherein the initiator value matches the access control value if there is a match to the pattern.

7. The method of claim 1, wherein the access control value comprises a string matching syntax, and wherein the initiator value matches the access control value if the initiator value matches the string matching syntax.

8. The method of claim 7, wherein the string matching syntax comprises a regular expression syntax.

9. A system for controlling access to an iSCSI target, the system comprising:
   a storage router having a processor, a memory and at least one network interface;
   a SCSI router component executing on the processor and the memory and operable to receive a request to access a target from an initiator through the network interface; and
   an access control list accessible to the SCSI router, said access control list having a set of one or more entries, each entry having an access control type and an access control value;
   wherein the SCSI router is operable to perform the tasks of:
      receive a set of one or more initiator authentication values, each of said initiator authentication values having an initiator authentication type;
      for each of the initiator authentication types, search the access control list for a matching authentication control type; and
      if a matching control type exists in the access control list for an authentication type, then if the authentication value does not match the access control value for the access control denying access to the target.

10. The system of claim 9, wherein the access control list is a linked list.

11. The system of claim 9, wherein the access control list is associated with a single target.

12. The system of claim 9, wherein the access control list type comprises an Internet Protocol type and the access control value defines one or more Internet Protocol addresses.

13. The system of claim 12, wherein the one or more Internet Protocol addresses are expressed as a bitmask defining a range of Internet Protocol addresses.

14. The system of claim 9, wherein the access control type comprises an iSCSI type and the access control value comprises an iSCSI name.

15. The system of claim 9, wherein the access control type comprises a CHAP type and the access control value comprises a CHAP name.

16. The system of claim 9, wherein the access control value comprises a pattern, and wherein the initiator value matches the access control value if there is a match to the pattern.

17. The system of claim 9, wherein the access control value comprises a string matching syntax, and wherein the initiator value matches the access control value if the initiator value matches the string matching syntax.

18. The system of claim 9, wherein the string matching syntax comprises a regular expression syntax.

19. A computer-readable medium having computer-executable instructions for performing a method for controlling access to a target on a storage area network, the method comprising:
   providing an access control list to an iSCSI router component of a storage router, the access control list having a set of one or more entries, each entry having an access control type and an access control value;
   receiving a request to access the target from an initiator;
   receiving a set of one or more initiator authentication values, each of said initiator authentication values having an initiator authentication type;

for each of the initiator authentication types, searching the access control list for a matching authentication control type; and if a matching control type exists in the access control list for an authentication type, then if the authentication value does not match the access control value for the access control denying access to the target.

20. The computer-readable medium of claim 19, wherein the access control list type comprises an Internet Protocol type and the access control value defines one or more Internet Protocol addresses.

21. The computer-readable medium of claim 19, wherein the one or more Internet Protocol addresses are expressed as a bitmask defining a range of Internet Protocol addresses.

22. The computer-readable medium of claim 19, wherein the access control type comprises an iSCSI type and the access control value comprising an iSCSI name.

23. The computer-readable medium of claim 19, wherein the access control type comprises a CHAP type and the access control value comprises a CHAP name.

24. The computer-readable medium of claim 19, wherein the access control value comprises a pattern, and wherein the initiator value matches the access control value if there is a match to the pattern.

25. The computer-readable medium of claim 19, wherein the access control value comprises a string matching syntax, and wherein the initiator value matches the access control value if the initiator value matches the string matching syntax.

26. The computer-readable medium of claim 19, wherein the string matching syntax comprises a regular expression syntax.

27. A system for controlling access to an iSCSI target, the system comprising:

means for providing an access control list to an iSCSI router of a storage router, the access control list having a set of one or more entries, each entry having an access control type and an access control value;

means for receiving a request to access the iSCSI target from an initiator;

means for receiving a set of one or more initiator authentication values, each of said initiator authentication values having an initiator authentication type; and means for searching the access control list, for a matching authentication control type;

wherein if a matching control type exists in the access control list for an authentication type, then if the authentication value does not match the access control value for the access control denying access to the target.

28. The system of claim 27, wherein the access control list type comprises an Internet Protocol type and the access control value defines one or more Internet Protocol addresses.

29. The system of claim 28, wherein the one or more Internet Protocol addresses are expressed as a bitmask defining a range of Internet Protocol addresses.

30. The system of claim 27, wherein the access control type comprises an iSCSI type and the access control value comprises an iSCSI name.

31. The system of claim 27, wherein the access control type comprises a CHAP type and the access control value comprises a CHAP name.

32. The system of claim 27, wherein the access control value comprises a pattern, and wherein the initiator value matches the access control value if there is a match to the pattern.

33. The system of claim 27, wherein the access control value comprises a string matching syntax, and wherein the initiator value matches the access control value if the initiator value matches the string matching syntax.

34. The system of claim 27, wherein the string matching syntax comprises a regular expression syntax.

* * * * *

UNITED STATES PATENT AND TRADEMARK OFFICE
CERTIFICATE OF CORRECTION

PATENT NO.        : 7,353,260 B1                                       Page 1 of 1
APPLICATION NO. : 10/461306
DATED             : April 1, 2008
INVENTOR(S)       : Senum It is certified that error appears in the above-identified patent and that said Letters Patent is hereby corrected as shown below:

In column 3, line 57, delete "LP" and insert -- IP --, therefor.

Signed and Sealed this

Fifteenth Day of July, 2008

JON W. DUDAS
*Director of the United States Patent and Trademark Office*